UNITED STATES PATENT OFFICE.

AUGUST JULIUS BERNARD KOCHS, OF CHICAGO, ILLINOIS.

BAKING-POWDER.

SPECIFICATION forming part of Letters Patent No. 673,057, dated April 30, 1901.

Application filed January 25, 1901. Serial No. 44,696. (No specimens.)

*To all whom it may concern:*

Be it known that I, AUGUST JULIUS BERNARD KOCHS, a citizen of the United States, and a resident of Chicago, in the county of Cook and State of Illinois, have invented a new and useful Composition of Matter for Use as a Baking-Powder in the Preparation of Farinaceous Foods, of which the following is a specification.

My invention relates to that class of compounds in which the active acid ingredient is an acid phosphate of lime.

Practically the phosphate of lime now in general use as an acid in admixture with a carbonate or bicarbonate of soda or potassa as the leavening agent in a baking preparation is the mono-calcium phosphate whose general formula is $Ca.H_4(PO_4)_2$. This phosphate has been diluted with a large percentage of some foreign inert substance (usually corn-starch) to give the product a certain definite strength, such strength being expressed in the amount of bicarbonate of soda which the phosphate is capable of neutralizing. Such diluent is necessary also in order to retard deterioration by reason of the hygroscopic property of the calcium phosphate, which in the presence of water and bicarbonate of soda releases carbonic acid, thus impairing the strength of the compound.

The object of my invention is to increase the stability of this phosphate without adding an inert material thereto, and I have discovered that the insoluble calcium phosphate whose formula is $Ca_2H_2P_2O_8$ is an active agent in connection with the bicarbonate of soda or potassa in the development of carbonic acid when subjected to heat and moisture, but acts at ordinary temperatures to lessen the hygroscopic tendency of the mono-calcium phosphate when in admixture with such mono-calcium phosphate. As an illustration of the insolubility of the neutral calcium phosphate $(Ca_2H_2P_2O_8)$ to which I refer, I may state the following as approximately its solubility, to wit: In boiled water, .0049 per cent.; in cold unboiled water, .028 per cent.; in water containing carbonic acid, .0347 per cent.

My invention consists in the composition of matter resulting from an admixture of the mono-calcium phosphate, $CaH_4(PO_4)_2$, with the insoluble calcium phosphate, $(Ca_2H_2P_2O_8,)$ and suitable proportions for the mixture are an equal quantity of these two phosphates, although I do not confine myself to these specific proportions.

The advantages possessed by my new composition of matter over the baking preparations now ordinarily in use are, first, that it is not necessary to use an inert material, such as starchy matters, to obtain the required strength, because the neutralizing power of the acid upon the alkali carbonate or bicarbonate may be regulated at will by varying the proportions of the two phosphates, respectively, the neutralizing strength of the mono-phosphate being approximately one hundred parts of phosphate to eighty parts of bicarbonate of soda, and the neutralizing strength of the insoluble phosphate being approximately one hundred parts to twenty-eight or thirty parts of bicarbonate of soda; second, that the presence of the insoluble calcium phosphate lessens the hygroscopic tendency of the mono-calcium phosphate, thus preventing deterioration in keeping, and, third, that while the mono-calcium phosphate gives a reaction with bicarbonate of soda or potassa and water at ordinary temperatures to develop carbonic acid in leavening the dough, the insoluble phosphate gives a reaction in the presence of bicarbonate of soda or potassa and water in the presence of heat to produce carbonic acid in the dough as the latter is placed in the oven. I thus get a successive action in the evolution of carbonic acid in the desired quantity and avoid the presence of inert material.

My invention includes also the use of my new composition of matter consisting of the said mixture of mono-calcium phosphate and the insoluble calcium phosphate in baking-powder or bread-making in combination with alkaline carbonates or bicarbonates, such as soda, potassa, &c.

Of course, as will be understood, inert materials, such as starch fillers, and also other acids may be mixed, if desired, with my new composition of mattter without departing from the spirit of my invention, although, as explained, such admixture is not necessary.

Having thus described my invention, what I claim is—

1. The new composition of matter consisting of a mixture of a mono-calcium phosphate and the insoluble calcium phosphate having the formula $Ca_2H_2P_2O_8$, substantially as described.

2. The new composition of matter consisting of a mixture of a mono-calcium phosphate, the insoluble calcium phosphate having the formula $Ca_2H_2P_2O_8$, and bicarbonate of soda, substantially as described.

AUGUST JULIUS BERNARD KOCHS.

Witnesses:
J. E. HINDON HYDE,
JAMES M. STEWART.